(12) United States Patent
Foster et al.

(10) Patent No.: US 10,654,736 B2
(45) Date of Patent: May 19, 2020

(54) COMPACT WATER PURIFICATION UNIT

(71) Applicant: Stonehouse Water Technologies, LLC, Milwaukee, WI (US)

(72) Inventors: Hensley Foster, Germantown, WI (US); Moe Mukiibi, Milwaukee, WI (US); Jay Schabelski, Roselle, IL (US)

(73) Assignee: Stonehouse Water Technologies, LLC, Milwaukee, WI (US)

( * ) Notice: Subject to any disclaimer, the term of this patent is extended or adjusted under 35 U.S.C. 154(b) by 92 days.

(21) Appl. No.: 16/102,433

(22) Filed: Aug. 13, 2018

(65) Prior Publication Data

US 2019/0047889 A1 Feb. 14, 2019

Related U.S. Application Data

(63) Continuation-in-part of application No. 15/924,862, filed on Mar. 19, 2018, now Pat. No. 10,500,529.

(Continued)

(51) Int. Cl.

| | | |
|---|---|---|
| *C02F 9/00* | (2006.01) | |
| *C02F 1/00* | (2006.01) | |
| *C02F 1/32* | (2006.01) | |
| *C02F 1/44* | (2006.01) | |
| *C02F 101/32* | (2006.01) | |
| *C02F 1/42* | (2006.01) | |
| *C02F 101/10* | (2006.01) | |
| *C02F 101/22* | (2006.01) | |
| *C02F 101/14* | (2006.01) | |
| *C02F 1/28* | (2006.01) | |
| *C02F 101/30* | (2006.01) | |
| *C02F 3/06* | (2006.01) | |
| *C02F 101/16* | (2006.01) | |

(Continued)

(52) U.S. Cl.
CPC .............. *C02F 9/005* (2013.01); *C02F 1/002* (2013.01); *C02F 1/008* (2013.01); *C02F 1/281* (2013.01); *C02F 1/283* (2013.01); *C02F 1/325* (2013.01); *C02F 1/42* (2013.01); *C02F 1/44* (2013.01); *C02F 3/06* (2013.01); *C02F 2101/103* (2013.01); *C02F 2101/12* (2013.01); *C02F 2101/14* (2013.01); *C02F 2101/163* (2013.01); *C02F 2101/20* (2013.01); *C02F 2101/203* (2013.01); *C02F 2101/22* (2013.01); *C02F 2101/301* (2013.01); *C02F 2101/306* (2013.01); *C02F 2101/322* (2013.01); *C02F 2201/004* (2013.01); *C02F 2201/005* (2013.01); *C02F 2201/006* (2013.01); *C02F 2201/007* (2013.01); *C02F 2209/02* (2013.01); *C02F 2209/03* (2013.01); *C02F 2209/40* (2013.01); *C02F 2301/043* (2013.01); *C02F 2305/10* (2013.01)

(58) Field of Classification Search
None
See application file for complete search history.

(56) References Cited

U.S. PATENT DOCUMENTS 10,500,529 B2 * 12/2019 Sellers .................... C02F 1/004

* cited by examiner

*Primary Examiner* — Chester T Barry
(74) *Attorney, Agent, or Firm* — Boyle Fredrickson S.C.

(57) ABSTRACT

The present apparatus is a compact water filtration unit providing modular, highly customizable water treatment. The standardized sump cylinder structure allows interchangeable accommodation of a wide variety of treatment media, filters, and treatment processes. The top-loading sump cylinders provide ease of servicing, while unique cylinder connectors allow a wide variety of treatment types and sequences without increasing the unit's footprint.

20 Claims, 10 Drawing Sheets

Related U.S. Application Data

(60) Provisional application No. 62/545,254, filed on Aug. 14, 2017.

(51) Int. Cl.
*C02F 101/20* (2006.01)
*C02F 101/12* (2006.01)

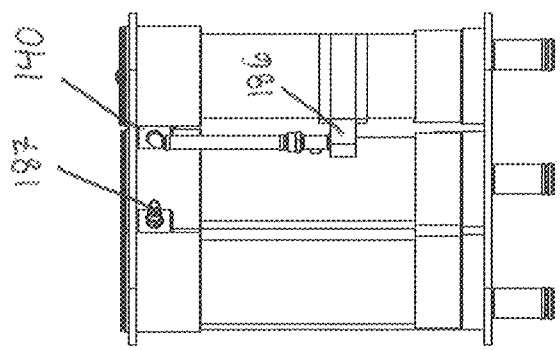
Fig. 1d
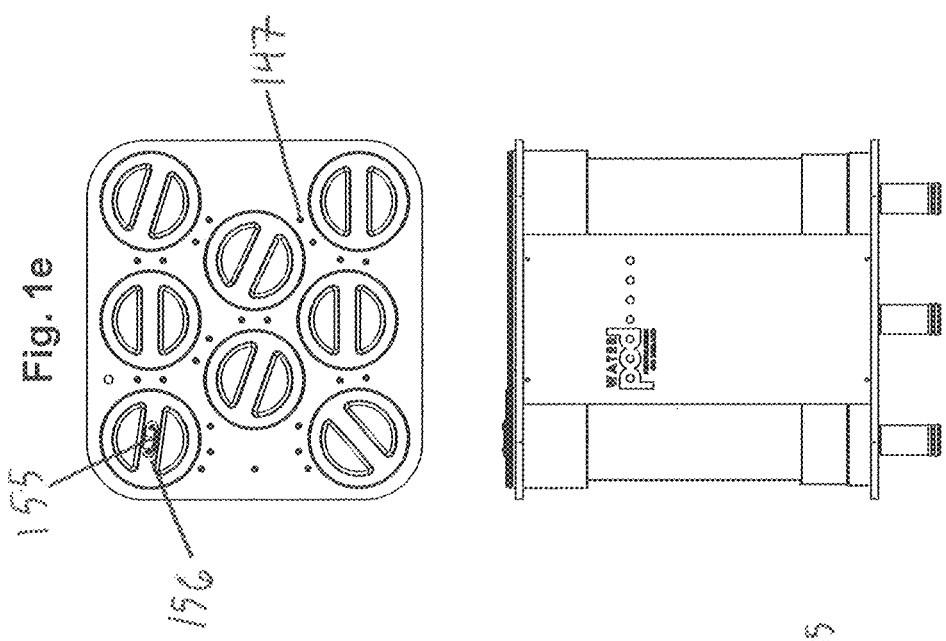
Fig. 1e
Fig. 1c
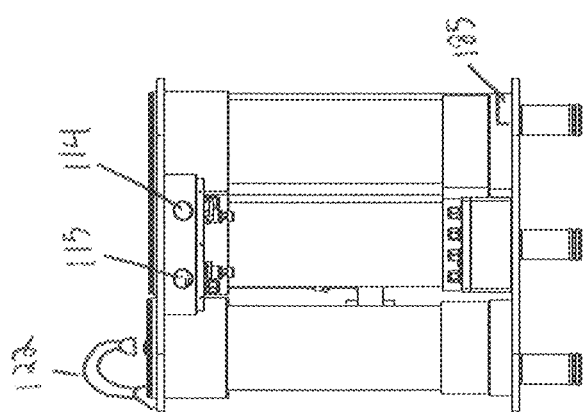
Fig. 1b

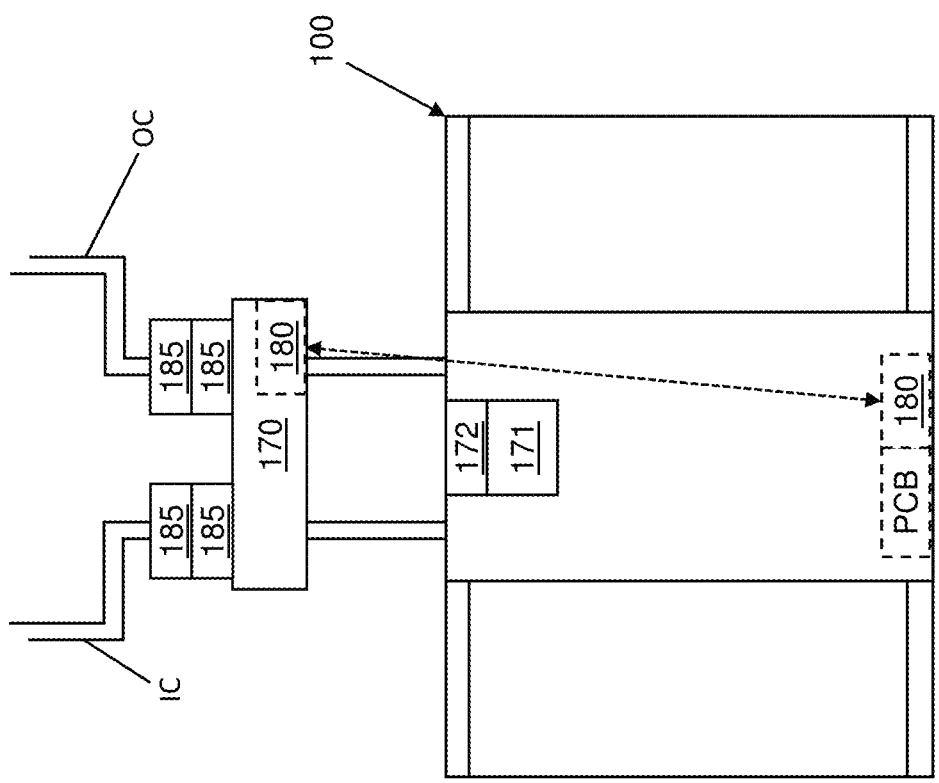

COMPACT WATER PURIFICATION UNIT

CROSS-REFERENCES TO RELATED APPLICATIONS

This application claims the benefit of prior-filed, U.S. Provisional Patent Application No. 62/545,254, filed on Aug. 14, 2017, and U.S. patent application Ser. No. 15/924,862, filed on Mar. 19, 2018, now U.S. Pat. No. 10,500,529, the contents of which are incorporated herein by reference in their entirety.

FIELD

The present disclosure is directed to an apparatus for the treatment of water, and more specifically to a compact unit utilizing modular filters to treat water.

BACKGROUND

Water exists at the core of human survival and economic development. Safe and readily available water is vital for public health, whether it is used for drinking, domestic applications, food production, or recreation. Lack of potable water throughout the world leads to an estimated yearly death toll of over 350,000 children under 5 years of age. Even highly developed countries face water contamination as aging infrastructure, expanding agriculture and industry, and an increasing population load on existing water sources lead to water safety crises. During the ongoing water contamination crisis in Flint, Mich., it is estimated that over 100 citizens died in one year as a result of consuming tainted municipal water. The number of children in Flint who suffered neurological damage due to staggeringly high lead levels may never be known.

Conventional systems for line water filtration are frequently unacceptably complex, expensive, and unadaptable. A system engineered to remove agricultural runoff in a rural area generally will not be adequate for removing the lead contamination from a pre-1980's municipal water system. Retooling such a system usually requires significant time and expense. Throughput of such systems also remains low, frequently limiting filtration to drinking water only. Such restriction can often result in contamination of clothing, eating utensils, and residential areas.

Use of conventional modular systems generally produces filtration systems which require manual installation of filters in large canisters with extensive pipe interconnections between canisters, resulting in bulky systems with a large footprint. Replacement of the filters is usually complex, has poor ergonomics, and causes water spillage which may contaminate the area. The mess and complexity of the replacement process frequently discourages proper maintenance and generally makes the systems unpopular.

There exists a continuing need for compact water purification apparatuses that enable easy access and replacement of filters.

BRIEF SUMMARY

The present apparatus provides a compact water purification unit apparatus with at least one unit inlet, at least one unit outlet, and a plurality of sump cylinders. Each of the plurality of sump cylinders includes a cylinder base, a cylinder top, a cylinder cap, and at least one of a removable filter or a treatment lamp extending within the interior of the sump cylinder. The cylinder cap removably extends into the cylinder top. Each sump cylinder has at least one cylinder inlet and at least one cylinder outlet. The cylinder inlet can be located at a height below the cylinder cap, while the cylinder outlet can be located at a height above the cylinder inlet. Each cylinder inlet is in fluid communication with either another sump cylinder or the unit inlet, while each cylinder outlet is in fluid communication with either another sump cylinder or the unit outlet. The apparatus also includes at least one cylinder connector forming a fluid path between a cylinder outlet of one of the sump cylinders and a cylinder inlet of another of the sump cylinders. A controller is in communication with at least one sensor, and comprises a unit power supply and a control processor.

Another aspect of the present application is a system similar to the above apparatus, but where the controller and sensors are separate from the compact water purification unit apparatus. The sensors, while still in communication with the controller, are connected to the incoming and outgoing water conduits that are connected to the unit inlet(s) and outlet(s), respectively. The controller is physically separate from the unit apparatus, allowing it, in one aspect, to be mounted to an external structure.

The objects and advantages will appear more fully from the following detailed description made in conjunction with the accompanying drawings.

BRIEF DESCRIPTION OF THE DRAWINGS

FIGS. 1a, 1b, 1c, 1d, and 1e are perspective, left, front, right, and top views, respectively, of an aspect of a compact water purification unit.

FIG. 6 is a side view of an aspect of a system incorporating a compact water purification unit.

DETAILED DESCRIPTION

Figure 1A:
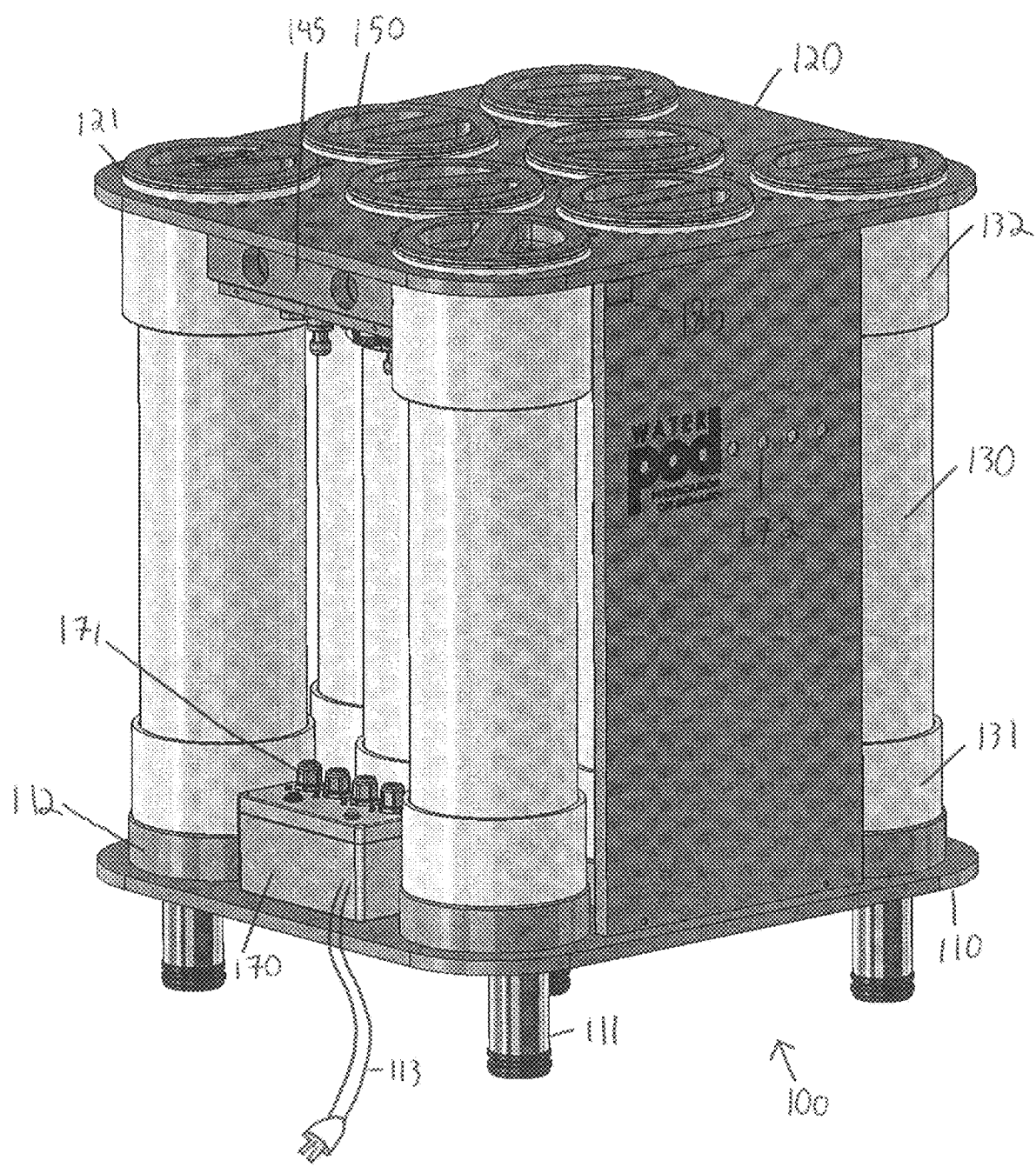

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

As shown in FIGS. 1a through 6, the present application provides a compact water purification unit 100 for filtration of water using modular filters. Unit 100 includes a base plate 110 and a top plate 120. Extending between base plate 110 and top plate 120 are a plurality of sump cylinders 130 interconnected in series and/or parallel by means of a plurality of cylinder connectors 140. Each sump cylinder 130 is closed by a cylinder cap 150.

Figure 4B:
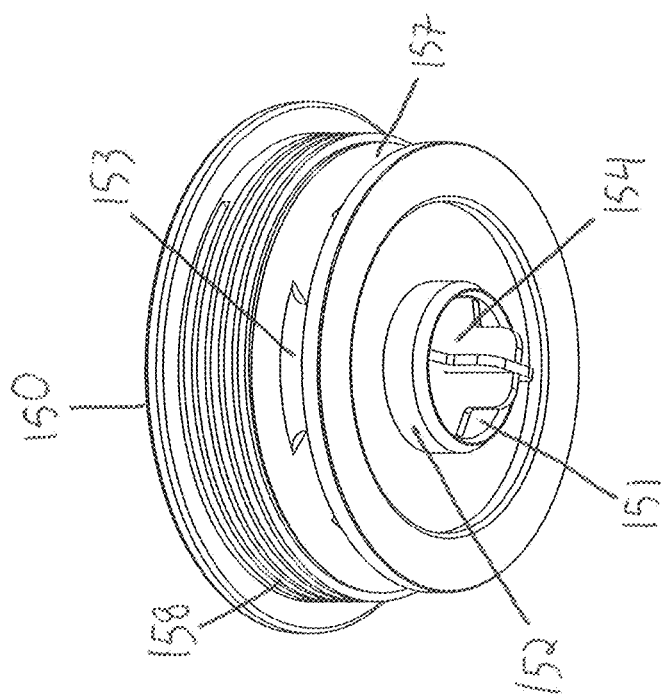
FIGS. 4a and 4b are top and bottom perspective views, respectively, of the cylinder cap of the compact water purification unit.
Figure 4A:
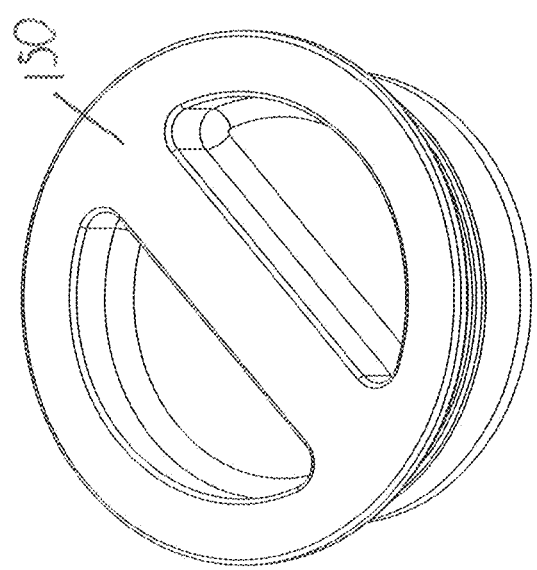
Figure 4E:
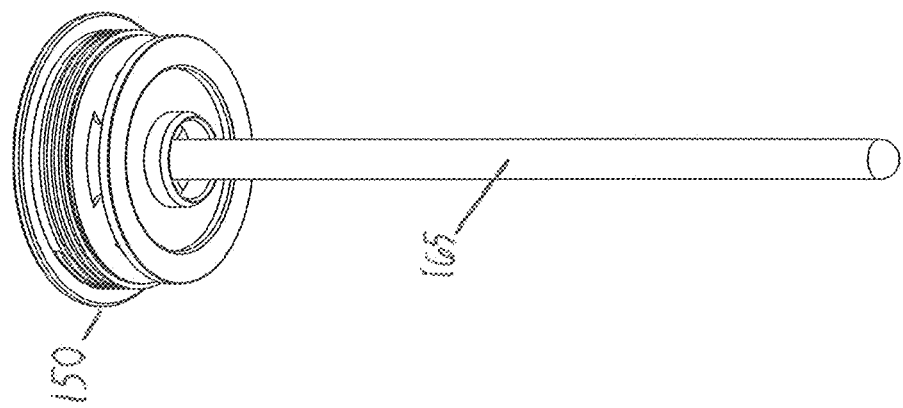
FIGS. 4c, 4d, and 4e are perspective views of the cylinder cap with connected removable filter, the sump cylinder with containerized treatment media, and the cylinder cap with connected treatment lamp, respectively, for the compact water purification unit.
Figure 4D:
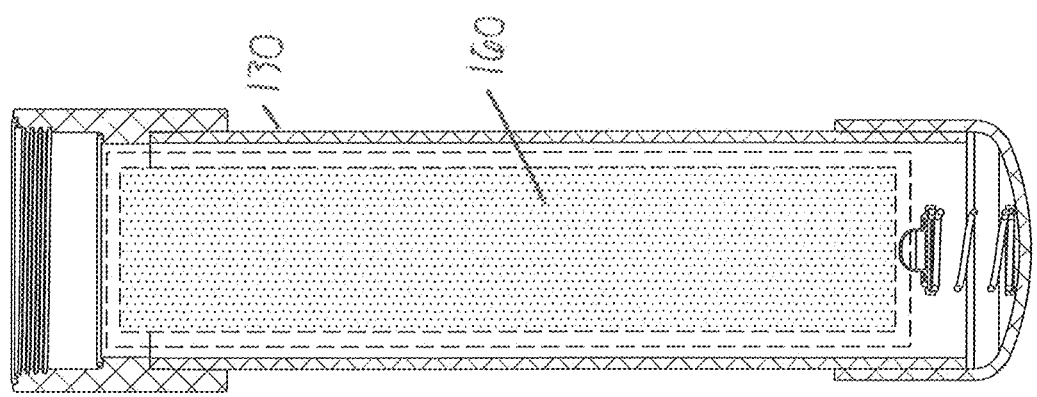
Figure 4C:
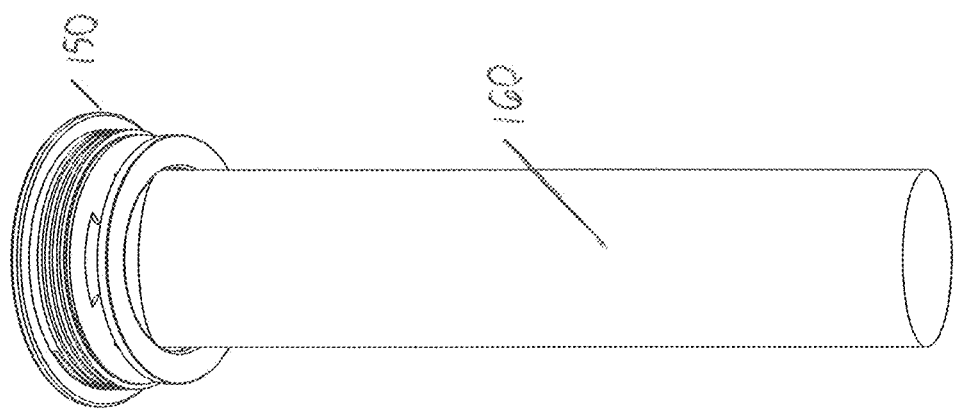

Each sump cylinder 130 includes a removable filter 160 or a treatment lamp 165 (as shown in FIGS. 4c, 4d, and 4e) for filtering or otherwise treating water passing through sump cylinder 130. The configuration of cylinder cap 150 with removable filter 160 or treatment lamp 165 (as shown in FIGS. 4c and 4e, respectively) allows simple, rapid removal and replacement of removable filter 160 or treatment lamp 165 from the top of unit 100, without the risk of spilling water from unit 100. In aspects using removable filter 160 with containerized treatment media (as shown in FIG. 4d), the position of cylinder cap 150 allows easy access to removable filter 160 for simple, rapid removal and replacement of removable filter 160.

Figures 2A, 2B:
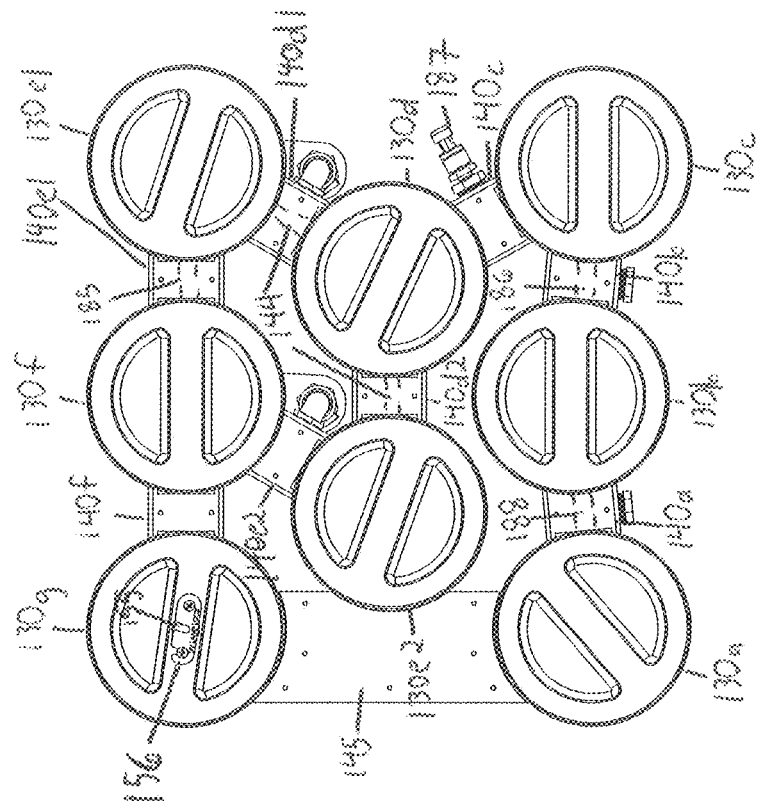
FIGS. 2a and 2b are perspective and top views, respectively, of the cylinder assembly within the compact water purification unit.

A controller 170 may direct operation of unit 100, with a transceiver 180 allowing communication between various elements of unit 100, or between unit 100 and an external system. Sensors 185 (as shown in FIGS. 1b and 2b) may be distributed throughout the interior or exterior of unit 100 to monitor at least one of water flow, water or ambient temperature, water turbulence, water or ambient pressure, water contaminant levels, ambient humidity, or any other water quality or environmental benchmark and provide such data to controller 170 or an external system. Sensors 185 may be in line with the fluid path or offset from, but still in fluid communication with the fluid path. Within this application, fluid communication is used to mean a connection allowing transport of fluid.

In certain aspects (as shown in FIGS. 1b and 6), a sensor 185 may also be mounted to an external structure such as, but not limited to, a water conduit or a wall. In such aspects, sensor 185 may be used to detect any exterior environmental conditions, such as high temperature and humidity, a flooded environment, or leakage from a sump cylinder 130, to prevent inefficient operation, damage to or contamination of unit 100, unsafe electrical conditions, or any other potential danger or malfunction. When connected to incoming and outgoing water conduits, sensors 185 may monitor incoming and outgoing water quality.

As shown in FIGS. 1a through 1e, unit 100 may include base plate 110 with a plurality of feet 111 supporting base plate 110 and adjustably raising base plate 110 above floor height. Base plate 110 can support a plurality of cylinder cradles 112, which in turn support the bottoms of the plurality of sump cylinders 130. Base plate 110 may also support controller 170, from which can extend unit power supply 113. While unit power supply 113 is shown as a line power cord, other aspects may use a battery power supply instead, or as backup in case of a loss of line power. In certain aspects using a separated controller 170, separate unit power supplies 113 may feed into controller 170 and into a power control board (PCB) on base plate 110 for distribution to various elements of unit 100 (as shown in FIG. 6).

Unit 100 includes at least one unit inlet 114 for receiving untreated water. Unit inlet 114 may receive untreated water from pipes, hoses, or other conduits extending from municipal or private sources of water, surface or ground water, other water treatment systems, as well as other water sources. Unit 100 includes at least one unit outlet 115 for dispensing treated water to pipes, hoses, or other conduits leading to a residential or commercial building's usable water supply. In certain aspects, unit inlet 114 and/or unit outlet 115 may receive and/or dispense water from and/or to other water treatment systems for further treatment. Certain aspects may incorporate at least one sensor 185 in line with the conduit and unit inlet 114 and/or unit outlet 115. Such sensors 185 may include at least one flowmeter 186, at least one pressure transducer 187, and at least one biological or chemical sensor 188, as shown in FIG. 2b. These sensors 185 may communicate with controller 170 or an external system to monitor incoming water quality and contaminants, and/or to monitor the efficacy of treatment for outgoing water.

As sump cylinders 130 may be supported on the bottom by cylinder cradles 112, they may also be supported at the top by access apertures 121 extending through top plate 120. The upper ends of sump cylinders 130 can extend through access apertures 121, keeping sump cylinders 130 in place while also allowing easy access to the tops of sump cylinders 130 for inspection, removal, and/or replacement of removable filters 160 and/or treatment lamps 165. In certain aspects, controller 170 and attendant elements may be mounted to top plate 120. In the aspect shown in FIG. 1b, a lamp cord 122 extends from controller 170 through top plate 120 for removable connection to treatment lamp 165 to provide power to treatment lamp 165. In aspects using a separated controller 170, lamp cord 122 may extend from a power control board (PCB).

Figure 3A:
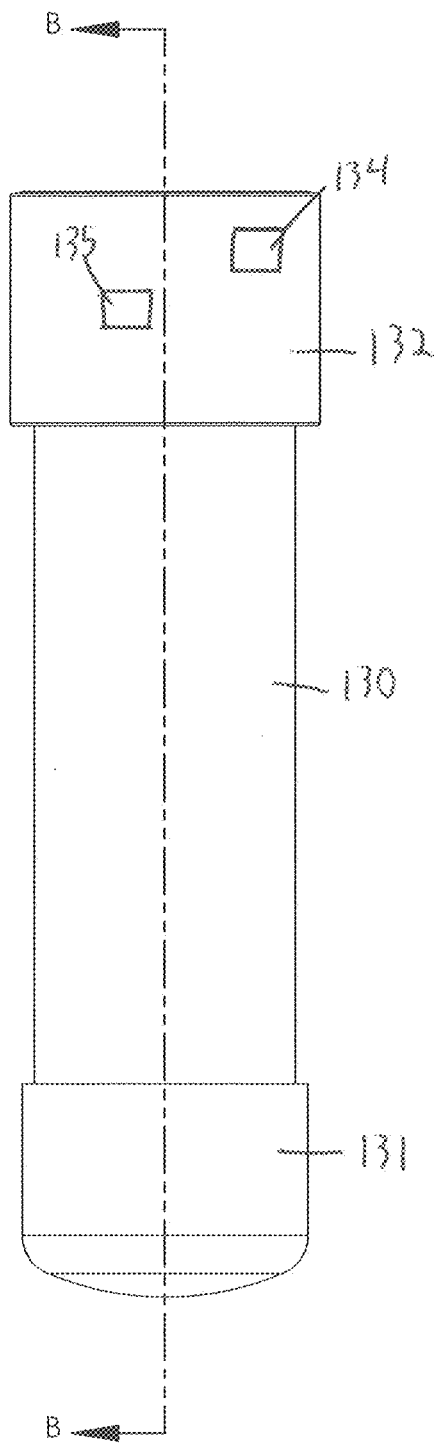
FIGS. 3a and 3b are front and cross-sectional views, respectively, of the sump cylinders of the compact water purification unit.
Figure 3B:
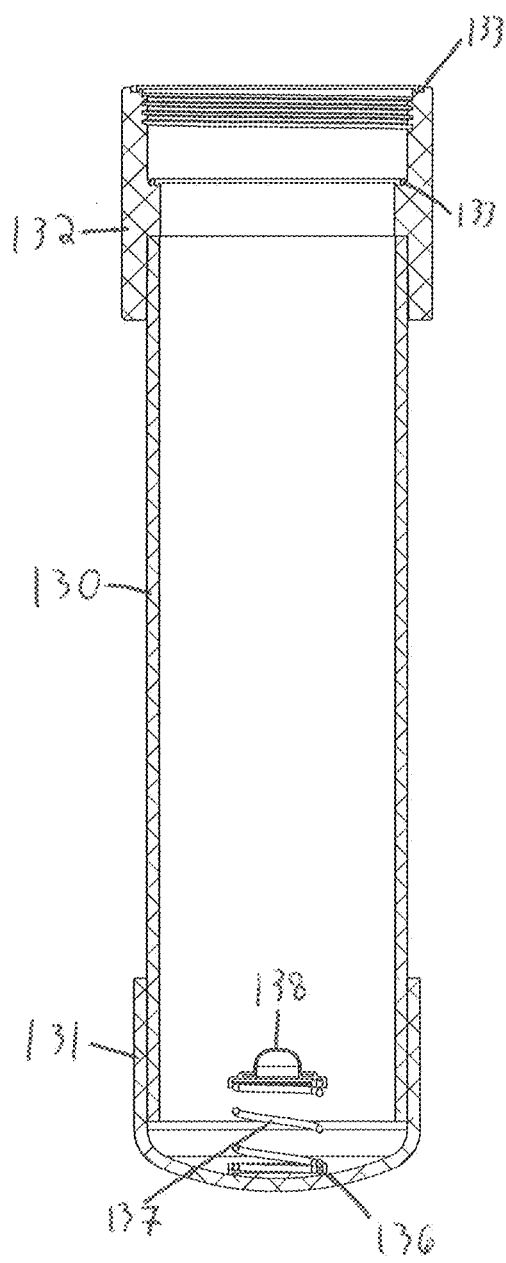

In the aspects shown in FIGS. 3a and 3b, sump cylinders 130 include a cylinder base 131 and a cylinder top 132 located at the bottom and top, respectively, of sump cylinder 130. Cylinder base 131 and cylinder top 132 may be attached to sump cylinder 130 through a threaded connection, an adhesive connection, a welded connection, and/or any other fluid-tight connection or combination of fluid-tight connections known in the art. In other aspects, cylinder base 131 and cylinder top 132 may be integrally molded, machined, or printed with sump cylinder 130. A pair of cylinder seals 133 rest within cylinder top 132. In certain aspects, cylinder seals 133 may be O-rings. The spacing between cylinder seals 133 can correspond to the approximate height of cylinder cap 150, allowing cylinder cap 150 to seal with cylinder top 132 at both the bottom and top, preventing the intermingling of treated and untreated water, external contamination, or loss of water from sump cylinder 130.

At least one cylinder outlet 134 and at least one cylinder inlet 135 extend through cylinder top 132 to allow passage of water. Each cylinder outlet 134 can be located at an elevation above any cylinder inlet 135 and between cylinder seals 133, while cylinder inlets 135 can be at an elevation below cylinder seals 133. This configuration may prevent intermingling of treated and untreated water. In other aspects, cylinder outlets 134 and cylinder inlets 135 can also be positioned at other heights relative to one another. Cylinder outlets 134 and cylinder inlets 135 may be radially spaced apart anywhere from 0 to 180 degrees. The flexible relative radial location of cylinder outlets 134 and cylinder inlets 135 may allow for more compact interconnection of sump cylinders 130, as shown in FIG. 2b.

Other aspects may include multiple cylinder outlets 134 and/or cylinder inlets 135. By way of non-limiting example, a sump cylinder 130 with a rapid treatment time may receive water through two cylinder inlets 135 from two sump cylinders 130 with slow treatment times. By way of another non-limiting example, a sump cylinder 130 with a rapid treatment time may distribute water through two cylinder outlets 134 to two sump cylinders 130 with slow treatment times. In certain aspects, sump cylinder 130 may receive water through at least one cylinder outlet 134 and/or discharge water through at least one cylinder inlet 135. In aspects where water is received through at least one cylinder outlet 134, the water is not treated within that sump cylinder 130, but instead mingles with water treated by that sump cylinder 130 and is discharged through yet another cylinder outlet 134. Such a configuration allows for the merging of water streams that were processed in parallel. In aspects where water is discharged through at least one cylinder inlet 134, the water is not treated within that sump cylinder 130, but instead travels to another sump cylinder 130 for treatment. Such a configuration allows for parallel or overflow processing.

A spring hub 136 may extend within each cylinder base 131, holding a compression spring 137 in place. Spring 137 may be a helical spring, wave spring, or any other type of compression spring known in the art. Spring 137 can bias a spring cap 138 to exert an upward force and press against the bottom end of the removable filter 160 extending through sump cylinder 130. This biasing force supports and keeps removable filter 160 in place in aspects using removable filter 160 connected to cylinder cap 150, even considering the numerous potential lengths and configurations of each removable filter 160. This can allow use of multiple different removable filters 160 with cylinder cap 150 in unit 100 without requiring that each sump cylinder 130 be tailored to the exact size and configuration of the respective removable filter 160. In aspects where removable filter 160 is containerized treatment media, the combination of spring hub 136, spring 137, and spring cap 138 can elevate removable filter 160 for better water flow-through.

Figure 2C:
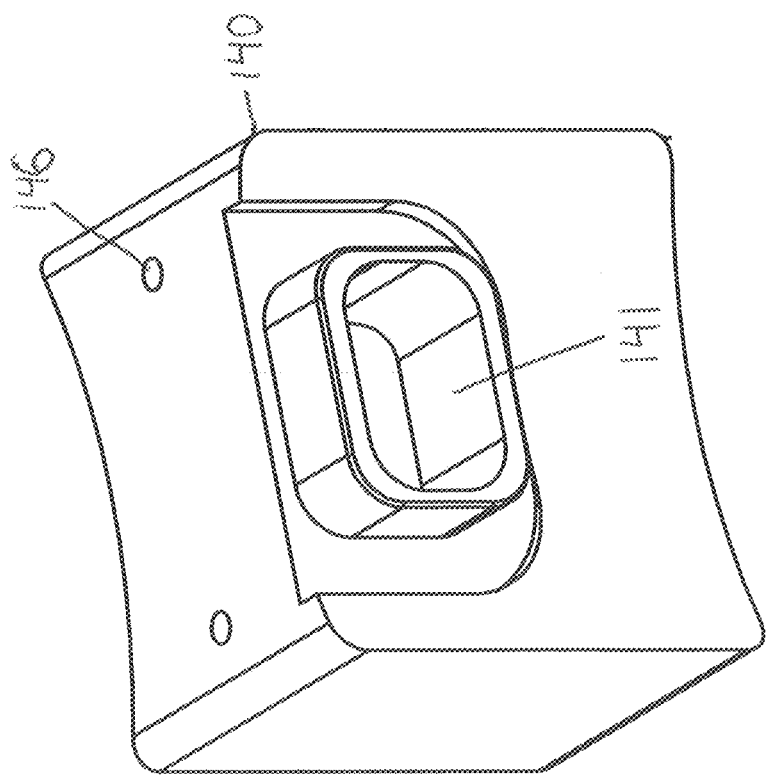
FIGS. 2c, 2d, 2e, and 2f are perspective, side, side, and side views, respectively, of various aspects of the cylinder connector of the compact water purification unit.
Figure 2D:
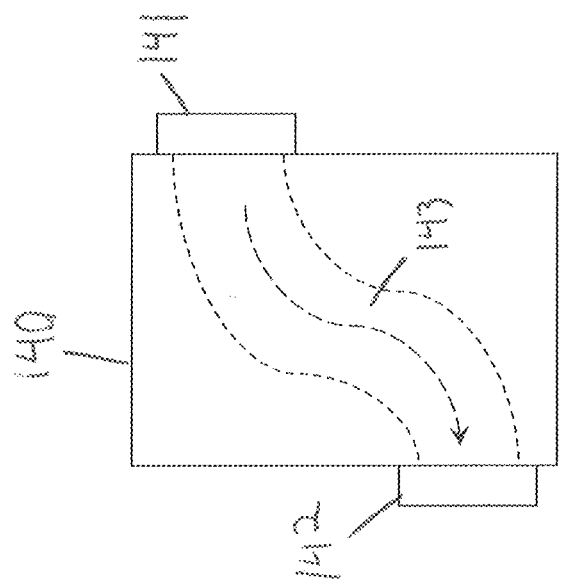

As shown in FIGS. 2a and 2b, a plurality of cylinder connectors 140 interconnect sump cylinders 130. In certain aspects, as shown in FIG. 2c, each cylinder connector 140 is a single-piece block with concave front and back surfaces, the curvature conforming to the exterior of sump cylinders 130. Cylinder connector 140 may include a connecter inlet 141 in fluid communication with a connecter outlet 142 by means of a connector channel 143. Connector channel 143 may have a serpentine, straight, curved, stepped, or combination configuration as it extends from connecter inlet 141 to connecter outlet 142. By way of non-limiting example using FIGS. 2a through 2f, connector 140a interconnects sump cylinder 130a and 130b. Connector inlet 141a receives water from cylinder outlet 134a of the first sump cylinder 130a, the water passing through a connector channel 143a. The water then feeds into cylinder inlet 135b of sump cylinder 130b through connector outlet 142a.

Figure 2F:
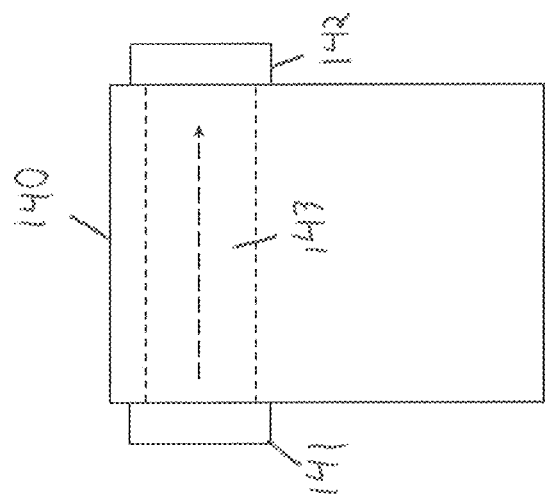
Figure 2E:
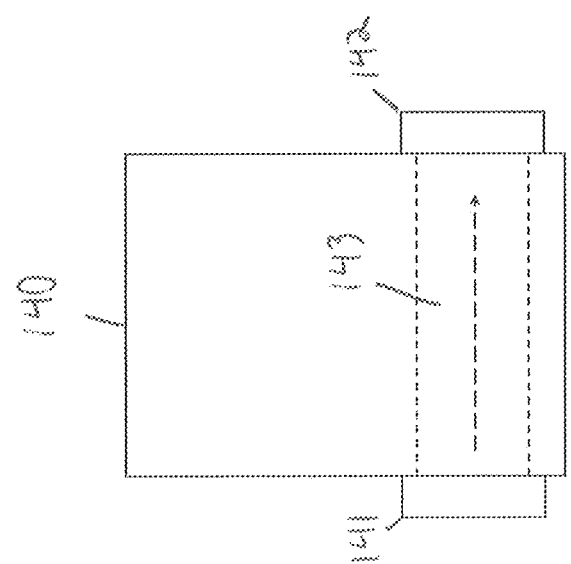

In certain aspects, as seen in FIG. 2e, connector 140 may include connector inlet 141 connected to connector outlet 142 by a straight connector channel 143, all at the height of cylinder inlet 135. This aspect connects the cylinder inlet 135 of a first sump cylinder 130 to a cylinder inlet 135 of a second sump cylinder 130. Such a configuration allows an incoming flow from a third sump cylinder 130 to be divided between the first and second sump cylinders 130, providing parallel processing of water or an overflow if first sump cylinder 130 fills. In certain aspects, as seen in FIG. 2f, connector 140 may include connector inlet 141 connected to connector outlet 142 by a straight connector channel 143, all at the height of cylinder outlet 134. This aspect connects the cylinder outlet 134 of a first sump cylinder 130 to a cylinder outlet 134 of a second sump cylinder 130. Such a configuration allows combination of the outgoing flows of the first and second sump cylinders 130 into a single stream flowing from another cylinder outlet 134 of second sump cylinder 130 to a third sump cylinder 130.

In certain aspects, as shown in FIG. 2b, connector channel 143 may include at least one sensor 185, such as, but not limited to, a flowmeter 186, a pressure transducer 187, or a biological or chemical sensor 188. Connector inlet 141 and connector outlet 142 utilize fluid-tight press-fit engagements with each respective cylinder outlet 134 and cylinder inlet 135, though other aspects may incorporate additional seals, adhesives, welding, or any other means of connection known in the art. While the aspect shown in FIGS. 2a and 2b includes eight interconnected sump cylinders 130, other aspects may include more or fewer sump cylinders 130 to accommodate differing water treatment requirements.

In certain aspects, at least one connector valve 144 may be a part of at least one cylinder connector 140. Connector valves 144 may be located within connector channel 143 or connected in series to connector inlet 141 or connector outlet 142. Depending on the type of valve used, connector valves 144 may allow cutoff of water flow between sump cylinders 130 (a cutoff valve) or prevent backflow in the case of a line blockage (a one-way valve). By way of non-limiting example, if a contaminant is only intermittently present, under the direction of controller 170, connector valve 144 may allow unit 100 to bypass the sump cylinder 130 responsible for filtering the contaminant when sensor 185 does not detect it in the water flow. Such a configuration may increase the life of the removable filter 165 and/or increase processing speed.

As shown in FIG. 2b, an inlet/outlet block 145 can connect the first sump cylinder 130a with the last sump cylinder 130g, without direct fluid communication between sump cylinders 130a and 130g. Inlet/outlet block 145 incorporates unit inlet 114 and unit outlet 115, as shown in FIG. 2b. In the aspect shown in FIG. 2b, untreated water is received into unit 100 through unit inlet 114 of inlet/outlet block 145, passes in series through the first sump cylinder 130a, to the second, third, and fourth sump cylinders 130b, 130c, and 130d, splits to pass through sump cylinders 130e1 and 130e2 in parallel, then converges through sump cylinder 130f. The partially treated water then passes the last sump cylinder 130g. Fully treated water then passes out through unit outlet 115 of inlet/outlet block 145. It should be understood that any number and combination of sump cylinders 130 in series and/or parallel may exist along the fluid path extending between unit inlet 114 and unit outlet 115 to treat any combination of contaminants in water. Processing through parallel sump cylinders 130 allows for additional filtration time within a removable filter 160 and/or treatment lamp 165, which may be necessary to fully treat certain types of contaminants without affecting overall processing time.

As shown in FIG. 2c, each cylinder connector 140 and inlet/outlet block 145 may also feature at least one fastener bore 146. Fastener bore 146 is a blind bore extending through an upper surface of cylinder connector 140 or inlet/outlet block 145. Each fastener bore 146 receives a connector fastener 147 extending at least partially through top plate 120 (shown in FIG. 1e) to attach cylinder connector 140 to top plate 120.

Each sump cylinder 130 can incorporate a cylinder cap 150, shown in FIGS. 4a through 4c and 4e. A cap channel 151 extends through each cylinder cap 150, from cap hub 152 at the bottom surface of cylinder cap 150 to at least one cap outlet 153 located at a sidewall of cylinder cap 150. Each threaded cylinder cap 150 includes a threaded portion 158 that mates with a threaded section of cylinder top 132. Threaded portion 158 is cut to ensure that, when cylinder cap 150 and cylinder top 132 are completely mated, at least one cap outlet 153 is in fluid communication with cylinder outlet 134. This configuration allows water to travel on a fluid path from the interior of sump cylinder 130, through filter 160 or about the treatment lamp 165, into cap channel 151 through cap hub 152, out cap outlet 153, and into cylinder outlet 134. In the aspect shown in FIG. 4b, each cap outlet 153 opens into an interstitial space 157 extending at least partially around the sidewall of the cylinder cap 150 below threaded portion 158, allowing for a greater volume of water flow.

Aspects of cylinder cap 150 using removable filter 165 will either connect removable filter 165 directly into cap hub 152 (for removable filters 165 with a double seal upper end) or first insert a cap adaptor 154 through cap hub 152 (for removable filters 165 with a single seal upper end). Cap adaptor 154 is a multi-bladed removable adaptor mounted in the diameter of cap channel 151, with a section having a smaller diameter extending from cap hub 152. Cap adaptor 154 centers and stabilizes removable filters 165 with a single seal upper end. While the aspect shown in FIG. 4b has a four-bladed configuration, it should be understood that other aspects may have more or fewer blades to accommodate different removable filters 160.

In certain aspects where cylinder cap 150 incorporates treatment lamp 165, a lamp channel 155, shown in FIGS. 1e and 2b, may extend extending from cap hub 152 through the upper surface of cylinder cap 150 to receiving an upper end of treatment lamp 165 and allow connection of lamp power cord 122 when treatment lamp 165 is disposed within sump cylinder 130. A lamp cord clamp 156 may be movably mounted to the upper surface of cylinder cap 150 to capture a section of lamp power cord 122 and prevent lamp power cord 122 from being dislodged. In the aspect shown in FIG. 2b, lamp cord clamp 156 is a rotatable oval clamp connected to cylinder cap 150 by means of a fastener extending through lamp cord clamp 156, with a first notch for capturing lamp power cord 122 in a friction grip and a second notch for capturing a second fastener.

As shown in FIG. 4c, removable filter 160 may be a cartridge-type filter capable of removing or deactivating contaminants within water as the water passes over or through the treatment media. As shown in FIG. 4d, in certain aspects removable filter 160 comprises treatment media housed in a container within sump cylinder 130, capable of removing or deactivating contaminants within water as the water passes over or through the treatment media. In various aspects, each removable filter 160 may remove or deactivate at least one of arsenic, cadmium, chromium, copper, iron, lead, mercury, nickel, and other metals, fluoride, chlorine, nitrates, pesticides, herbicides, volatile organic compounds, organic compounds, pharmaceuticals, hormones, bleach, and other chemicals, bacteria, viruses, cysts, prions, fecal material, urine, parasitic or infectious organisms, and other biological matter, soap, shampoo, detergent, and other cleaning products, dissolved minerals, sediment and other particulate or colloidal material, and any other contaminants found in water. In various aspects, each removable filter 160 may contain treatment media such as, but not limited to, porous or non-porous ceramic or metal, photoreactive materials, activated or non-activated carbon or charcoal, redox media, ion exchange resins and other selective resin media, glass or fiberglass, sand, gravel, clay, manganese greensand, zeolites, diatomaceous earth, paper, woven or non-woven fabric, mesh, microorganisms, membranes, calcium carbonate, salts, and other water treatment chemicals, and any other treatment media known in the art.

As shown in FIG. 4e, treatment lamp 165 may be a transparent bulb, tube, or rod housing at least one light-generating element. The light-generating element may produce light in infrared, visible, and/or ultraviolet wavelengths, a wavelength range of approximately 10 nm to approximately 1 mm, or a segment thereof. The intensity of the light may be fixed or variable depending upon the power provided to treatment lamp 165. Such power control may be accomplished through programming in controller 170, and variable based on predetermined criteria or feedback from sensors 185. In certain aspects, removable filter 160 may be combined with treatment lamp 165 within the same sump cylinder 130, the combination having a catalytic or synergistic effect on the treatment media, such as, but not limited to, photoelectrochemical or photoelectrocatalytic oxidation.

Figure 5:
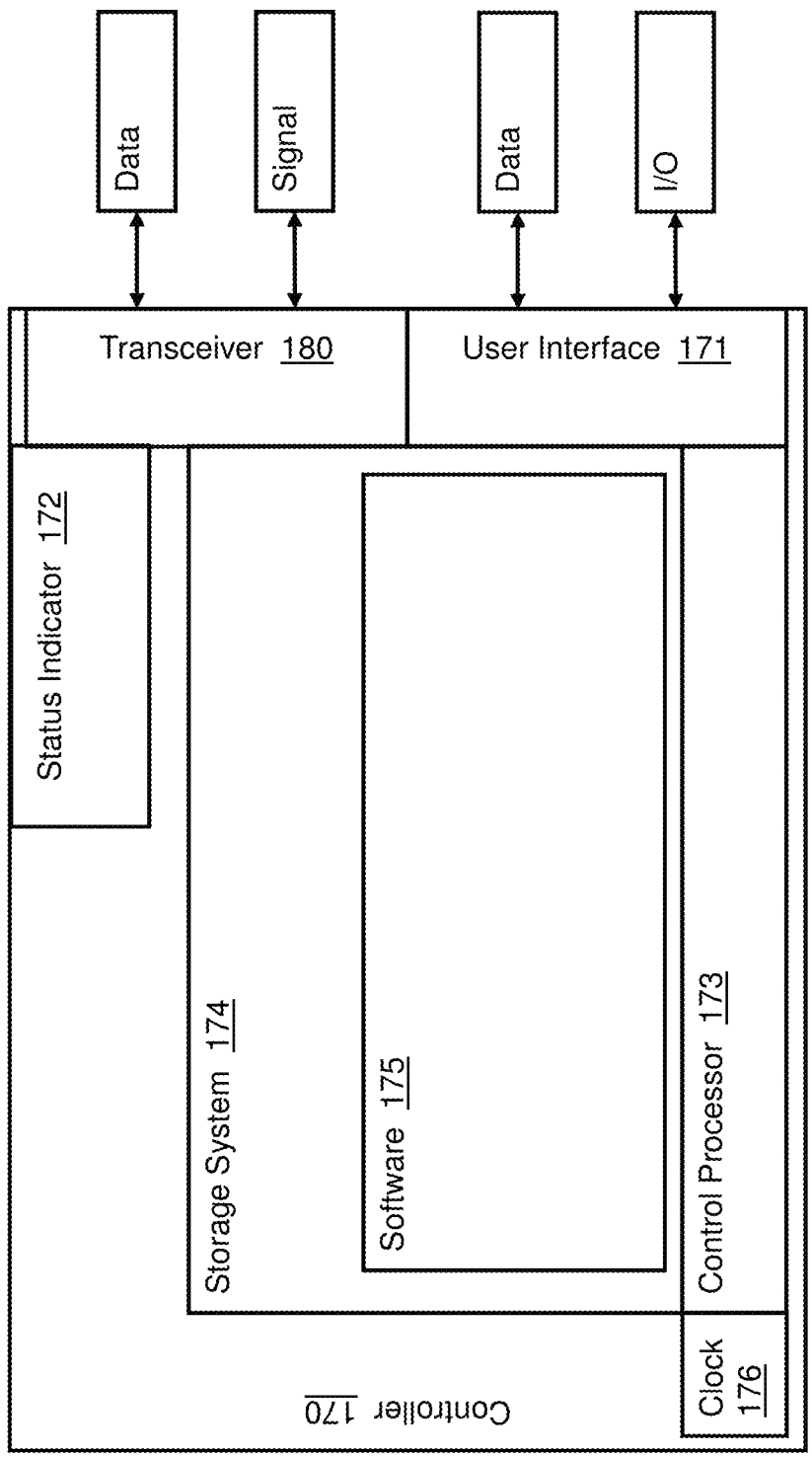
FIG. 5 is a plan view of a controller used in one aspect of the compact water purification unit.

As shown in FIG. 5, controller 170 can direct overall function of unit 100. Controller 170 is generally a computing system that includes a user interface 171, a status indicator 172, a control processor 173, a storage system 174, software 175, and a transceiver 180, or a partial combination of at least some of the aforementioned elements. In some aspects, controller 170 also includes a clock 176 for monitoring the life of unit 100 and/or removable filters 160.

User interface 171 is capable of receiving commands and other input from a user and/or an external system, providing output to the user and/or external system, and receiving data and other feedback from other elements of unit 100. User interface 171 can include, but is not limited to, a graphic user interface (GUI), a joystick, a keyboard, a mouse, a keypad, a voice input device, a touch input device for receiving a gesture from a user, a motion input device for detecting non-touch gestures and other motions by a user, and other comparable input devices and associated processing elements capable of receiving input from a user. Speakers, printers, and other types of output devices may also be included in the user interface 171. Output devices such as a video display or graphical display can display data and/or information further associated with aspects of the invention disclosed herein.

Status indicator 172 can provide easy-to-interpret general status output for unit 100. By way of non-limiting example, status indicator 172 may consist of differently colored LED lights which indicate whether unit 100 is fully functional, in need of maintenance, or non-functional, and/or an alarm tone if unit 100 malfunctions.

Control processor 173 can receive and process input from one or more users, external systems, and/or units 100, and may provide any control signals necessary for appropriate operation of unit 100. By way of non-limiting example, if sensor 185 detected an anomalous amount of lead in the water output from unit 100, control processor 173 may send an alarm signal to status indicator 172 to indicate potential malfunction of unit 100. Control processor 173 may load and execute software 175 from the storage system 174. When executed by controller 170, software 175 directs the control processor 173 to operate as described in further detail in accordance with the above-mentioned capabilities.

While the description as provided herein refers to a controller 170 and a control processor 173, it is to be recognized that implementations of such systems can be performed using one or more processors, which may be communicatively connected, and such implementations are considered to be within the scope of the description. Within this application, communicatively connected is used to mean a wired or wireless connection allowing transmission of data, commands, and other information. It is also contemplated that these components of controller 170 may be operating in a number of physical locations.

The control processor 173 can comprise a microprocessor and/or other circuitry that retrieves and executes software 175 from storage system 174. Control processor 173 can be implemented within a single processing device but can also be distributed across multiple processing devices or subsystems that cooperate in existing program instructions. Examples of control processors 173 include general purpose central processing units, application specific processors, and logic devices, as well as any other type of processing device, combinations of processing devices, or variations thereof.

The storage system 174 can comprise any storage media readable by control processor 173 and capable of storing software 175. The storage system 174 can include volatile and non-volatile, removable and non-removable media implemented in any method or technology for storage of information, such as computer readable instructions, data structures, program modules, or other information. Storage system 174 can be implemented as a single storage device but may also be implemented across multiple storage devices or sub-systems. Storage system 174 can further include additional elements, such a separate processor capable of communicating with the control processor 173.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some aspects, the storage media can be a non-transitory storage media. In some aspects, at least a portion of the storage media may be transitory. Storage media may be internal or external to unit 100.

As described in further detail herein, controller 170 may send and/or receive system information through transceiver 180. The information can include activation, deactivation, and/or feedback signals to and/or from any component of unit 100 capable of such transmission or reception. In aspects, the transceiver 180 also operates to send and/or receive data, as described in greater detail above, such as, but not limited to, data to/from other modules, devices, and/or systems to which controller 170 is communicatively connected. Such data can include transmissions to and/or from connector valves 144, sensors 185, and/or any other component(s) of unit 100 capable of transmitting or receiving data. Any information and/or data so received and/or transmitted may be stored in storage system 174. Transceiver 180 may also perform satellite- or other telemetry-based locating of unit 100 to prevent theft of unit 100 from its installation site or improper use of unit 100. In certain aspects, transceiver 180 uses a cellular network; other aspects may use other wireless or wired modalities.

In the system shown in FIG. 6, controller 170 is physically separated from unit 100 and attached to the incoming water conduit (designated as IC) and outgoing water conduit (designated as OC) connected to unit inlet 114 and unit outlet 115, respectively. In certain aspects, controller 170 may also be situated at other suitable locations, such as, but not limited to, on a wall, structural support, or other external structure. In other aspects, controller 170 may be situated at other suitable locations, such as, but not limited to, at a central control panel on-site with the remainder of unit 100, or at a remote site. Sensors 185 are connected to incoming and outgoing water conduits and may monitor water quality and contaminant levels for both intake and output sides. This data is provided to controller 170 to allow control processor 173 to make any processing adjustments necessary to unit 100. In this aspect, user interface 171 and/or status indicators 172 may be located on controller 170 and/or unit 100. Transceivers 180 allow communicative connection between unit 100 and controller 170. A power control board (PCB) can control power input to unit 100, independently and/or under the direction of controller 170.

Base plate 110 and top plate 120 may be manufactured from materials including thermoplastic resin, thermosetting polymers, elastomeric polymers, and metals. Sump cylinders 130 may be made from polymers such as, but not limited to, polyvinylchloride (PVC) and chlorinated PVC, stainless steel, or any other material that is non-reactive with the contaminants and appropriate for potable water processing. Cylinder connectors 140 may be made from polymers that are non-reactive with the contaminants and appropriate for potable water processing, including, but not limited to, thermoplastics such as polyoxymethylene. Seals may be made from FDA-grade nitrile. Various other components may be made from materials including PVC, polyethylene terephthalate, lead-free brass, stainless steel, or any other material that is non-reactive with the contaminants and appropriate for potable water processing.

In the foregoing description, certain terms have been used for brevity, clearness, and understanding. No unnecessary limitations are to be inferred therefrom beyond the requirement of the prior art because such terms are used for descriptive purposes and are intended to be broadly construed. Any different configurations, systems, and method steps described herein may be used alone or in combination with other configurations, systems, and method steps. It is to be expected that various equivalents, alternatives, and modifications are possible within the scope of the appended claims.

What is claimed is:
1. A water purification unit apparatus, comprising:
at least one unit inlet and at least one unit outlet;
a plurality of sump cylinders, each of the plurality of sump cylinders comprising:
    a cylinder base, a cylinder top, and a cylinder cap, the cylinder cap removably extending into the cylinder top,
    at least one of a removable filter or a treatment lamp extending within the interior of the sump cylinder,
    wherein each of the plurality of sump cylinders comprises at least one cylinder inlet and at least one cylinder outlet, the at least one cylinder inlet being located at a height below the cylinder cap, the at least one cylinder outlet being located at a height above the at least one cylinder inlet,
    wherein the at least one cylinder inlet of each of the plurality of sump cylinders is in fluid communication with either another of the plurality of sump cylinders or the at least one unit inlet,
    wherein each of the at least one cylinder outlet of each of the plurality of sump cylinders is in fluid communication with either another of the plurality of sump cylinders or the at least one unit outlet;
at least one cylinder connector forming a fluid path between one of the plurality of sump cylinders and another of the plurality of sump cylinders; and a controller in communication with at least one of the plurality of sump cylinders and at least one sensor, the controller comprising a unit power supply and a control processor.

2. The apparatus of claim 1, further comprising a base plate supporting the cylinder base of each of the plurality of sump cylinders and a top plate, wherein each cylinder top extends through one of a plurality of access apertures in the top plate.

3. The apparatus of claim 1, each of the plurality of sump cylinders further comprising a pair of cylinder seals bracketing the at least one cylinder outlet, and located above the at least one cylinder inlet.

4. The apparatus of claim 1, each of the plurality of sump cylinders further comprising a spring hub extending upwardly from the cylinder base, a compression spring extending upwardly from the spring hub.

5. The apparatus of claim 4, further comprising a spring cap connected to the top of the compression spring.

6. The apparatus of claim 1, wherein the at least one cylinder connector comprises a connector channel extending between a connector inlet and a connector outlet, wherein the connector inlet forms a fluid-tight connection with the at least one cylinder outlet of one of the plurality of sump cylinders and the connector outlet forms a fluid-tight connection with the at least one cylinder inlet of another of the plurality of sump cylinders.

7. The apparatus of claim 6, wherein the connector inlet of the at least one cylinder connector is located at a height above the connector outlet of the at least one cylinder connector.

8. The apparatus of claim 6, wherein the connector inlet of the at least one cylinder connector is located at a height level with the connector outlet of the at least one cylinder connector.

9. The apparatus of claim 1, wherein the at least one cylinder connector comprises at least one connector valve, wherein the connector valve is either a one-way valve or a cutoff valve.

10. The apparatus of claim 1, wherein the cylinder cap comprises a cap channel extending between a cap hub located at the bottom surface of the cylinder cap and a cap outlet located at a sidewall of the cylinder cap below a threaded portion of the cylinder cap, the cap hub receiving water from the interior of the sump cylinder and the cap outlet delivering water to the at least one cylinder outlet.

11. The apparatus of claim 10, wherein the cylinder cap further comprises a cap adapter extending from the cap hub, the cap adaptor receiving an upper end of the removable filter.

12. The apparatus of claim 10, wherein the cylinder cap further comprises a lamp channel extending from the cap hub through the upper surface of the cylinder cap, the lamp channel receiving an upper end of the treatment lamp.

13. The apparatus of claim 10, wherein the cylinder cap further comprises an interstitial space between the cap outlet and the at least one cylinder outlet, wherein the interstitial space extends at least partially around the sidewall of the cylinder cap below the threaded portion of the cylinder cap.

14. The apparatus of claim 1, further comprising at least one user interface communicatively connected to the controller.

15. The apparatus of claim 1, further comprising at least one status indicator communicatively connected to the controller.

16. The apparatus of claim 1, wherein the at least sensor is in line with the fluid path, offset from but still in fluid communication with the fluid path, mounted to an exterior of the apparatus, or mounted to an external structure.

17. The apparatus of claim 16, wherein the at least sensor monitor at least one of water flow, water or ambient temperature, water turbulence, water or ambient pressure, water contaminant levels, or ambient humidity.

18. A water purification system, comprising:
a controller comprising a unit power supply and a control processor;
a plurality of sensors in communication with the controller, the plurality of sensors comprising at least one sensor connected to an incoming conduit and at least one sensor connected to an outgoing conduit; and
at least one compact water purification unit apparatus in communication with but physically separated from the controller, the at least one compact water purification unit apparatus comprising:
at least one unit inlet connected to the incoming conduit and at least one unit outlet connected to the outgoing conduit;
a plurality of sump cylinders, each of the plurality of sump cylinders comprising:
a cylinder base, a cylinder top, and a cylinder cap, the cylinder cap removably extending into the cylinder top,
at least one of a removable filter or a treatment lamp extending within the interior of the sump cylinder,
wherein each of the plurality of sump cylinders comprises at least one cylinder inlet and at least one cylinder outlet, the at least one cylinder inlet being located at a height below the cylinder cap, the at least one cylinder outlet being located at a height above the at least one cylinder inlet,
wherein the at least one cylinder inlet of each of the plurality of sump cylinders is in fluid communication with either another of the plurality of sump cylinders or the at least one unit inlet,
wherein each the at least one cylinder outlet of each of the plurality of sump cylinders is in fluid communication with either another of the plurality of sump cylinders or the at least one unit outlet, and
at least one cylinder connector forming a fluid path between one of the plurality of sump cylinders and another of the plurality of sump cylinders.

19. The system of claim 18, wherein the controller is mounted to an external structure.

20. The system of claim 18, wherein the at least one compact water purification unit apparatus further comprises at least one transceiver in communication with the controller.

* * * * *